(12) United States Patent
Toyoshima et al.

(10) Patent No.: US 8,036,541 B2
(45) Date of Patent: Oct. 11, 2011

(54) COHERENT OPTICAL RECEIVER

(75) Inventors: Morio Toyoshima, Tokyo (JP); Nozomu Nishinaga, Tokyo (JP); Yoshihisa Takayama, Tokyo (JP); Hiroo Kunimori, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 635 days.

(21) Appl. No.: 12/199,050

(22) Filed: Aug. 27, 2008

(65) Prior Publication Data

US 2009/0060511 A1 Mar. 5, 2009

(30) Foreign Application Priority Data

Aug. 31, 2007 (JP) .................................. 2007-225040

(51) Int. Cl.
*H04B 10/06* (2006.01)
(52) U.S. Cl. ..................... 398/204; 398/202; 398/206
(58) Field of Classification Search ........... 398/202–214
See application file for complete search history.

(56) References Cited

U.S. PATENT DOCUMENTS

2006/0285854 A1* 12/2006 Sun et al. ...................... 398/155

FOREIGN PATENT DOCUMENTS

JP 11-041207 2/1999

OTHER PUBLICATIONS

Kazuro Kikuchi, "Phase-Diversity Homodyne Detection of Multilevel Optical Modulation With Digital Carrier Phase Estimation", IEEE Journal of Selected Topics in Quantum Electronics, vol. 12, No. 4, Jul./Aug. 2006, pp. 563-570.

* cited by examiner

*Primary Examiner* — Ken Vanderpuye
*Assistant Examiner* — Mancil Littlejohn
(74) *Attorney, Agent, or Firm* — McGlew and Tuttle, P.C.

(57) ABSTRACT

A coherent optical receiver includes a 90-degree optical hybrid circuit to which a received signal light is input, I-channel and Q-channel photo detectors to which the outputs of the hybrid circuit are input, a clock extraction circuit which reproduces a clock whose speed is the same as a demodulated signal obtained by demodulating the received signal light and which is synchronized therewith, I-channel and Q-channel sampling circuits which sample the signal outputs from the I-channel and Q-channel photo detectors by use of the clock, and a digital signal processing section which digitally processes the sampled signals, converts them to a digital signal, and outputs the digital signal. The digital signal processing section feeds a phase offset signal detected there back to the clock extraction circuit to thereby control the phase of the clock, and compensates dispersion of light within a fiber and phase fluctuation during free-space propagation.

4 Claims, 5 Drawing Sheets

COHERENT OPTICAL RECEIVER

BACKGROUND OF THE INVENTION

1. Field of the Invention

The present invention relates to a coherent optical receiver which is used for terrestrial optical fiber communications, spatial optical communications between terrestrial stations, spatial optical communications between satellites, spatial optical communications between a terrestrial station and a satellite, and communications between fixed and mobile transmitters and receivers. The coherent optical receiver can be synchronized with a clock extracted from an optical phase modulated signal, and compensate propagation distortion of signals, and can receive signals modulated in two optical modulation schemes; i.e., intensity modulation and modulation for coherent communications.

2. Description of the Related Art

There has been known a coherent communication scheme which utilizes laser light's intrinsic nature as a wave, and transmits a signal by modulating the frequency or phase of the laser light, in contrast to ordinary optical communications in which a signal is transmitted by modulating the intensity of light waves. Such a coherent communication scheme can be used in the optical communication field requiring large-capacity transmission, the fiber information communication field, the optical communication field requiring long-distance transmission, the field of space communications near the earth, and the field of deep space communications. In the coherent communication scheme, optical detection (demodulation) is effected by means of mixing signal light and local oscillation light. A phase-diversity reception scheme has been proposed so as to realize such detection of coherent light (see Patent Document 1).

FIG. 4 is a diagram showing an optical receiver of a phase-diversity reception scheme described in Patent Document 1. PSK-modulated input signal light is transmitted from a transmitter (not shown) to the receiver. In the illustrated receiver, the input signal light is demodulated by means of delay detection utilizing a phase-diversity scheme, which is realized by a 90-degree optical hybrid for splitting the input signal light to quadrature components I and Q, a pair of photo detectors, a pair of 1-bit delay lines for delay detection (demodulation), and a pair of two-input, four-quadrant output analog multipliers. The outputs of the multipliers are added together, whereby a signal component is output.

An AFC circuit includes a frequency discriminator, a LPF (low-pass filter) which allows passage therethrough of components near DC which are necessary for AFC, and a local oscillation light source. The output of the local oscillation light source is supplied to the 90-degree optical hybrid. In the phase-diversity reception scheme, the AFC circuit is configured to reduce to zero the frequency difference between the local oscillation light and the signal light.

As described above, the illustrated receiver can demodulate a PSK modulated signal by means of delay detection utilizing the phase-diversity scheme. However, since phase detection is not performed by digital processing, compensation for fiber dispersion and phase compensation for atmospheric fluctuation cannot be performed. Further, the receiver cannot cope with both intensity modulation and coherent modulation.

Non-Patent Document 1 discloses a phase-diversity reception scheme adapted to digital processing. FIG. 5 is a diagram showing a coherent optical reception apparatus of a phase-diversity reception scheme described in Non-Patent Document 1. In the illustrated reception apparatus, signal light transmitted from a transmitter side is input to a phase-diversity homodyne receiver along with local oscillation light from a local oscillation light source. The homodyne receiver mixes the input signal light and the local oscillation light having the same frequency as the input signal light so as to directly obtain low-frequency electric signals $IPD_1$ and $IPD_2$. The low-frequency electric signals $IPD_1$ and $IPD_2$ have a phase difference of 90° therebetween (SIN and COS waves), and carry pieces of information regarding the amplitude and phase of the optical signal, respectively. The low-frequency electric signals $IPD_1$ and $IPD_2$ are led to a digital processing circuit DSP via respective low-pass filters LPF and analog/digital converters ADC. The digital processing circuit DSP detects a carrier phase, and demodulates data. Normally, the frequency of the local oscillation light must be made coincident with that of the input signal light by use of PLL (phase-locked loop: phase synchronization circuit). In contrast, the illustrated coherent optical reception apparatus does not utilize PLL and absorbs the frequency deviation through the digital processing. However, in reality, achieving transmission speed of a few Gbps in real time is difficult until new devices are developed. Since the reception apparatus shown in FIG. 5 does not employ PLL, a beat attributable to the frequency deviation is superimposed on the output of the homodyne receiver. Therefore, sampling at the analog/digital converters ADC cannot be performed in synchronism with the data signal such that sampling is performed one time in each symbol period. Therefore, when a signal is transmitted at, for example, 10 Gbps, the analog/digital converters ADC must perform high-speed processing of about 100 G samples/S, which is ten times the transmission speed (see FIG. 3).

[Patent Document 1] Japanese Patent Application Laid-Open (kokai) No. 11-41207

[Non-Patent Document 1] Kazuro Kikuchi, "Phase-Diversity Homodyne Detection of Multilevel Optical Modulation With Digital Carrier Phase Estimation," IEEE JOURNAL OF SELECTED TOPICS OF QUANTUM ELECTRONICS, VOL. 12, NO. 4, JULY/AUGUST 2006

SUMMARY OF THE INVENTION

As described above, when optical coherent communications are realized by means of digital processing, operating analog/digital converters at a sampling frequency higher than a transmission speed is difficult in actuality, because of limitation on the operation speeds of the analog/digital converters.

An object of the present invention is to solve the above-described problems and to provide a coherent optical receiver which does not require optical PLL, whose clock can be synchronized with an optical phase modulated signal, and which can receive signals modulated in two optical modulation schemes; i.e., intensity modulation and modulation for coherent communications.

A coherent optical receiver according to the present invention comprises a 90-degree optical hybrid circuit which receives an optical-coherent-modulated signal light and local oscillation light, splits the received signal light to quadrature components I and Q, and outputs the quadrature components I and Q; I-channel and Q-channel photo detectors which respectively receive the quadrature components I and Q output from the 90-degree optical hybrid circuit; a clock extraction circuit which demodulates the received signal light so as to reproduce a clock whose speed is the same as that of the demodulated signal and which is synchronized therewith; I-channel and Q-channel sampling circuits which sample respective signals output from the I-channel and Q-channel photo detectors, at timings determined by the reproduced clock; and a digital signal processing section which digitally processes the sampled signals fed from the I-channel and Q-channel sampling circuits, converts the sampled signals to a digital signal, and outputs the digital signal. A phase offset signal detected by the digital signal processing section is fed back to the clock extraction circuit so as to control the phase of the clock. By use of filter functions realized by digital processing, the digital signal processing section compensates dispersion of light within a fiber and phase fluctuation during free-space propagation.

Further, the received signal light is signal light having undergone optical PSK modulation; the received signal light is input directly to a coupler as first signal light, and the received signal light is also input to the coupler via a 1-bit delay circuit as second signal light so as to multiply the first signal light and the second signal light together; and light produced as a result of the multiplication is detected by an optical detector so as to obtain a demodulated signal, from which the clock is reproduced. Alternatively, the received signal light is demodulated by I-channel and Q-channel multipliers which multiply the signals from the I-channel and Q-channel photo detectors by the same signals having passed through respective 1-bit delay circuits, and an adder which adds outputs of the two multipliers; and the clock is reproduced from a signal produced as a result of the demodulation of the received signal light. The coherent optical receiver is configured to cope with not only optical-coherent-modulated signal light, but also intensity-modulated signal light by turning the local oscillation light off.

According to the present invention, clock extraction can be performed independently on the reception side, and the load imposed on digital processing decreases, whereby transmission speed can be increased. Further, extraction of a clock signal of the transmission speed is enabled through delay detection of light or through delaying and multiplication of signals produced by receiving light in a heterodyne scheme, and the sampling circuits are operated by the clock signal. Thus, the transmission speed of optical coherent communications can be increased.

Further, the present invention enables the coherent optical receiver to cope with various modulation schemes, such as light intensity modulation and coherent modulation, and to be generally used in the field of optical communication without changing its configuration. Further, since a signal containing complex information can be digitally processed, compensation of dispersion of light within a fiber and compensation of phase fluctuation due to atmospheric turbulence during free-space transmission can be carried out in real time.

DETAILED DESCRIPTION OF THE PREFERRED EMBODIMENTS

Figure 1:
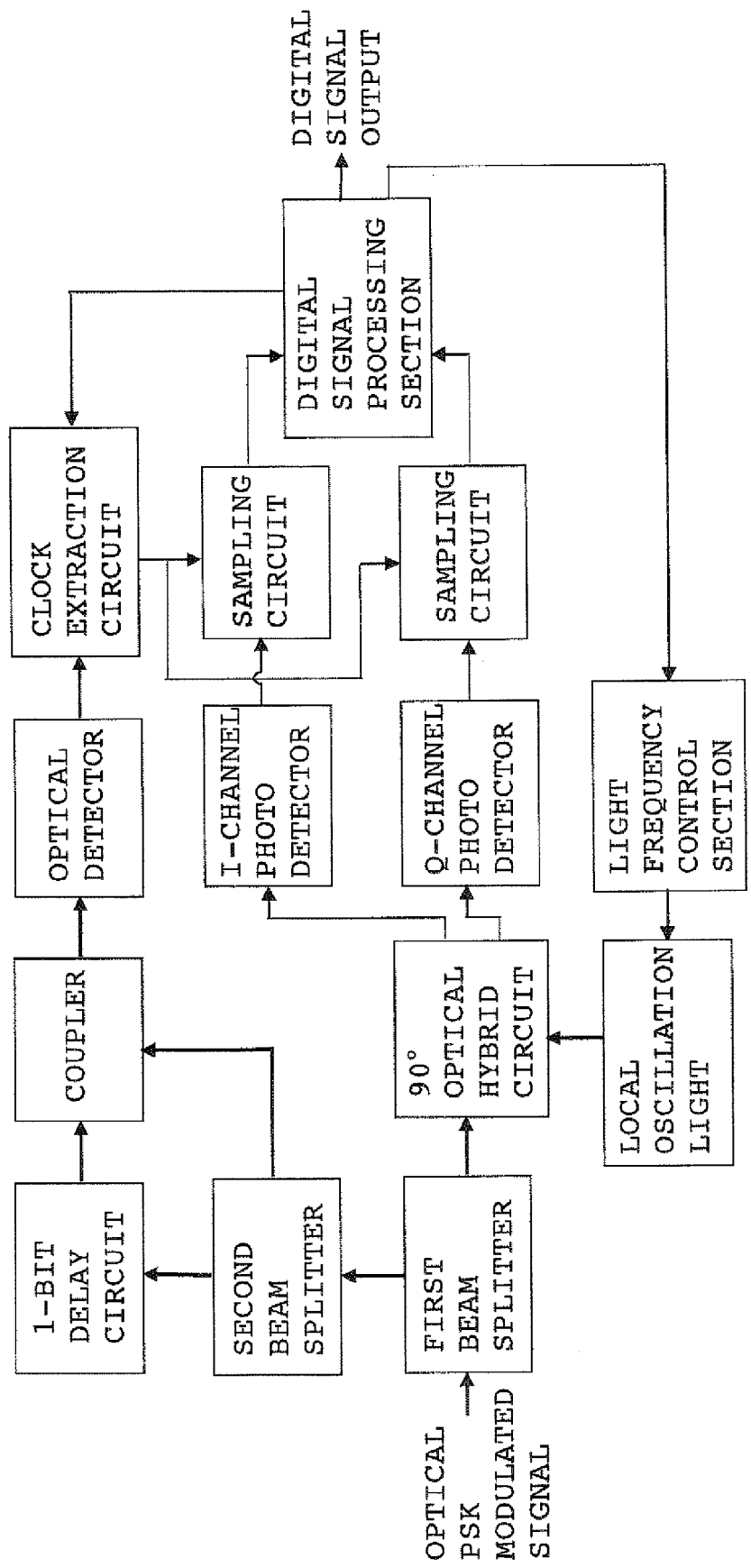
FIG. 1 is a circuit diagram of a coherent optical receiver showing a first embodiment of the present invention.

The present invention will now be described by way of examples. FIG. 1 is a circuit diagram of a coherent optical receiver showing a first embodiment of the present invention. FIG. 1 shows an example in which extraction of a clock signal is performed at the optical signal level. An optical PSK (in particular, DPSK or BPSK) modulated signal (light beam) transmitted from a coherent optical transmitter (not shown) is split to two light beams by means of a first beam splitter. One light beam is led to a 90-degree optical hybrid circuit for splitting the input signal light to quadrature components I and Q. The other light beam is led to a second beam splitter. In the 90-degree optical hybrid circuit, the light beam is mixed with local oscillation light, and the resultant quadrature components I and Q are led to photo detectors for I and Q channels. The electric signal output from the photo detectors have a phase difference of 90° therebetween (SIN and COS waves), and carry pieces of information regarding the amplitude and phase of the optical signal, respectively.

One of light beams output from the second beam splitter is led to a coupler via a 1-bit delay circuit, and the other light beam is led directly to the coupler, at which the two light beams are multiplied together. An optical detector (demodulator) detects (demodulates) a light beam produced as a result of the multiplication, and a clock extraction circuit reproduces a clock whose speed is the same as that of the detected signal and which is synchronized therewith. That is, when the optical detector carries out simple demodulation of a phase-modulated signal, a clock can be extracted from the demodulated signal. Therefore, for light beams modulated by a method other than DPSK and BPSK, an optical detector suitable for the modulation method is used. For example, in the case of QPSK, the above-described operation can be realized through employment of a phase modulated signal having undergone data conversion by differential coding and through introduction of a one-symbol delay circuit.

The signals from the I-channel and Q-channel photo detectors are sampled by respective sampling circuits for the I and Q channels, and the sampled signals are fed to a digital signal processing section. When the signals from the I-channel and Q-channel photo detectors are sampled by the respective sampling circuits, the timing of the sampling is determined by the extracted clock signal. Since the clock is extracted from the transmitted signal, the extracted clock is in synchronism with the signals from the I-channel and Q-channel photo detectors. Further, the phase offset between the clock signal and the data signal is fed back to the clock extraction circuit so as to control the phase of the clock to an optimal phase so as to maximize the inter-signal distance on a phase plane of the phase signal detected by the digital processing section.

The data sampled by the sampling circuits undergo digital signal processing, whereby the phase of the vector component of the signal is detected. In addition, the sampled data are demodulated into a digital signal on the basis of the detected phase. The digital signal processing section weights and feeds back the demodulated signal by use of a finite impulse response (FIR) filter and an infinite impulse response (IIR) filter, realized by digital processing, to thereby perform dispersion compensation using an inverse function of dispersion characteristics of a fiber transmission path, and to compensate phase and amplitude disturbances stemming from fluctuation due to atmospheric turbulence during free-space propagation.

The electric signal of the Q channel (or the I channel) or the output of the digital signal processing section is fed to a light frequency control section. On the basis of the electric signal or the output, the light frequency control section adjusts the frequency of the local oscillation light to a frequency band in which a beat frequency can be detected as an electric signal. When the local oscillation light is turned off, an intensity-modulated optical signal can be received. In the case of an intensity-modulated optical signal, when the signal overlaps a signal produced by delaying the first signal, the level becomes double. However, since the signal component retains a frequency component of the transmission speed, the period of the clock can be detected. Moreover, in the case where the level of the signal must be maintained constant, the second beam splitter, the 1-bit delay circuit, and the coupler are removed, or a limiter function is added to the clock extraction circuit.

The digital signal processing section extracts the frequency component of a beat signal, and supplies to the light frequency control section a signal for increasing and decreasing the light frequency. At that time, when the beat frequency is high, the light frequency control section controls the light frequency of the local oscillation light such that the beat frequency drops.

Figure 2:
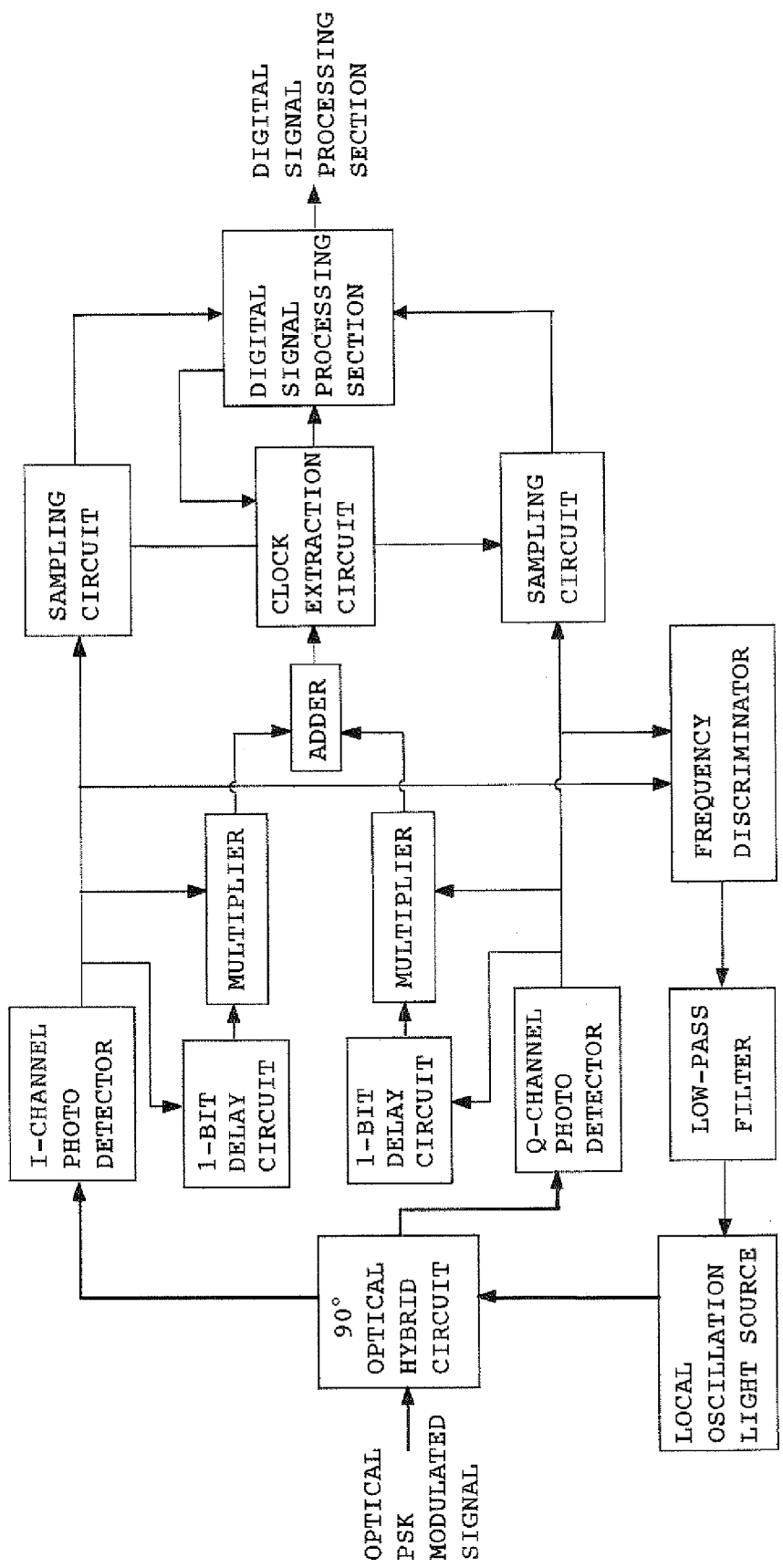
FIG. 2 is a circuit diagram of a coherent optical receiver showing a second embodiment of the present invention.

FIG. 2 is a circuit diagram of a coherent optical receiver showing a second embodiment of the present invention. FIG. 2 shows an example in which clock signal extraction is carried out at the electrical signal level, and control of local oscillation light is performed by an analog signal. An optical PSK modulated signal and local oscillation light are mixed together by a 90-degree optical hybrid circuit, and the resultant quadrature components I and Q are led to photo detectors for I and Q channels. The electric signal output from the photo detectors and the same signals having passed through respective 1-bit-delay circuits are multiplied together by respective multipliers. Outputs from these multipliers are added together by an adder, whereby simple demodulation of the signal is carried out. From a signal (demodulated signal) produced as a result of the demodulation, a clock extraction circuit reproduces a clock whose speed is the same as that of the demodulated signal and which is synchronized therewith. Since the clock is extracted from the transmitted signal, the extracted clock is in synchronism with the signals fed from the I-channel and Q-channel photo detectors to sampling circuits. Further, the phase signal detected by the digital signal processing section is fed back to the clock extraction circuit so as to control the phase of the clock.

The signals from the I-channel and Q-channel photo detectors are sampled by the respective sampling circuits, and the sampled signals are fed to the digital signal processing section. When the signals from the I-channel and Q-channel photo detectors are sampled by the respective sampling circuits, the timing of the sampling is determined by the extracted clock signal. The data sampled by the sampling circuits undergo digital signal processing, whereby the phase of the vector component of the signal is detected. In addition, the sampled data are demodulated into a digital signal on the basis of the detected phase. By use of filter functions realized by digital processing, the digital signal processing section compensates dispersion of light within a fiber, and compensates phase fluctuation during free-space propagation. Further, the coherent optical receiver has a function of adjusting the frequency of the local oscillation light on the basis of the signal of the Q channel (or the I channel). When the local oscillation light is turned off, reception of an intensity-modulated optical signal becomes possible without changing the optical section.

Figure 3:
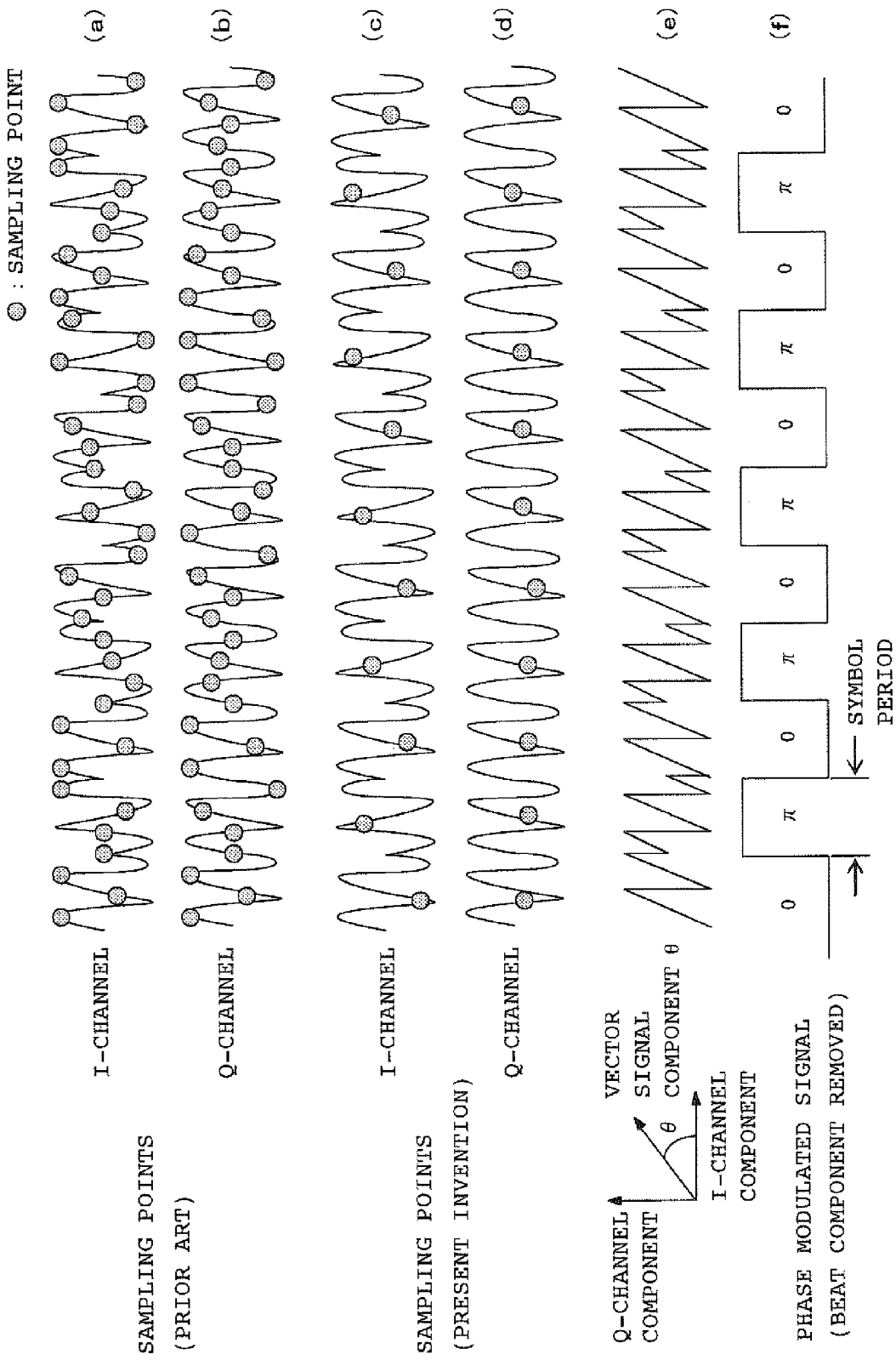
FIG. 3 is a set of time charts showing, for comparison, sampling according to the present invention and sampling according to a conventional technique.
Figure 4:
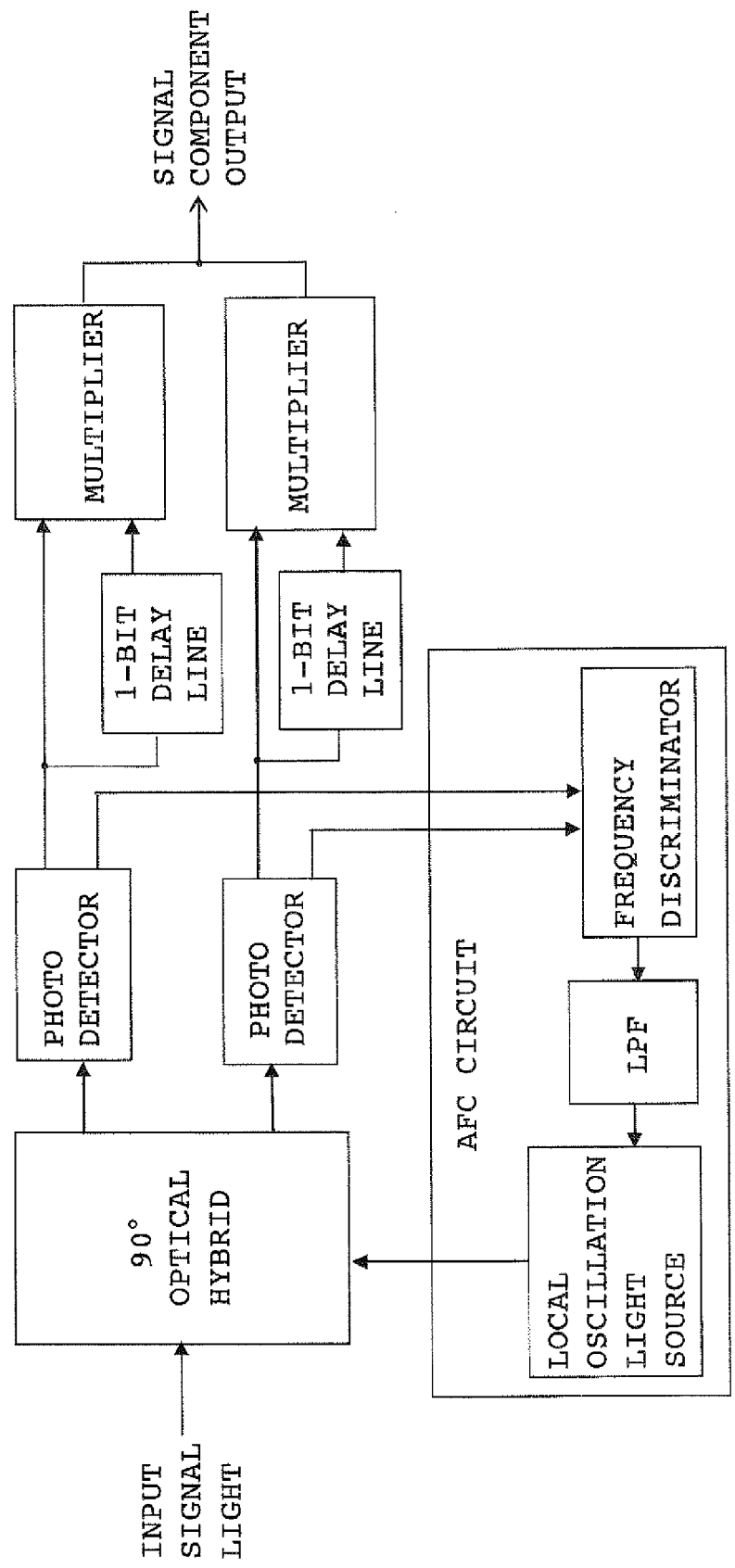
FIG. 4 is a diagram showing an optical receiver of a phase-diversity reception scheme described in Patent Document 1.
Figure 5:
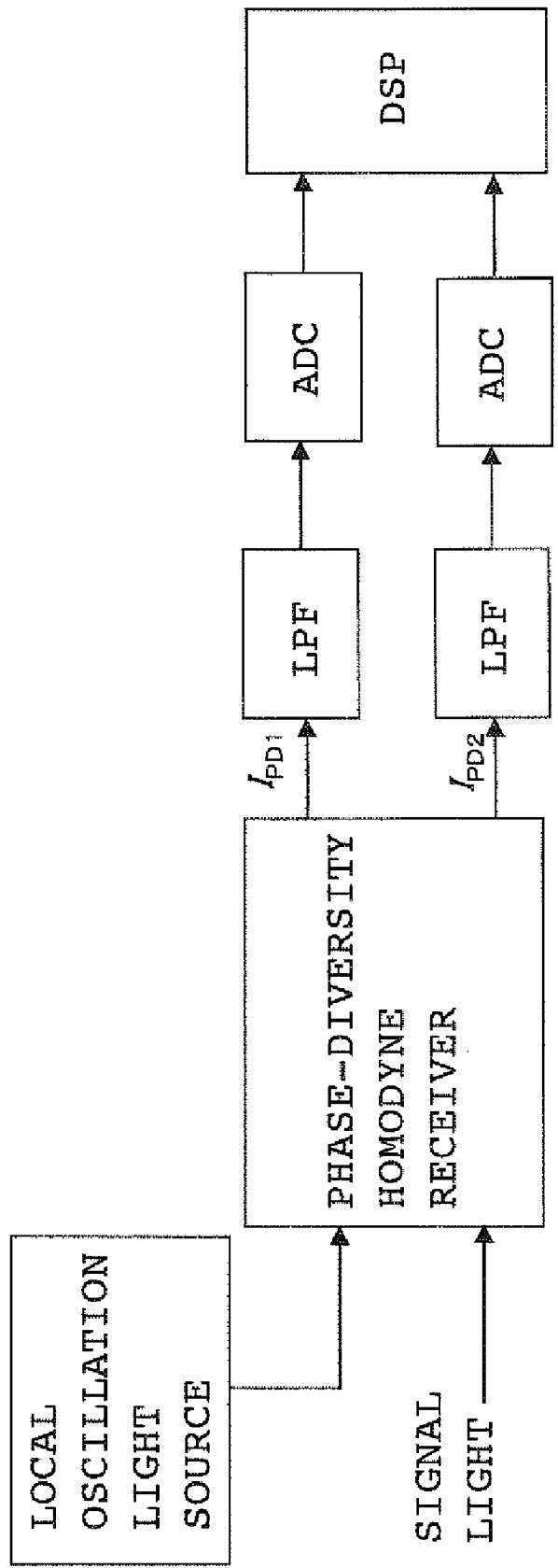
FIG. 5 is a diagram showing a coherent optical reception apparatus of a phase-diversity reception scheme described in Non-Patent Document 1.

FIG. 3 is a set of time charts showing sampling according to the present invention for comparison with sampling according to a conventional technique. In FIG. 3, an example beat component is shown in sections (a) to (c). A phase modulated signal is assumed to cause a phase shift in each symbol period as shown in the bottom section (f). Sections (a) and (b) of FIG. 3 show sampling points of the received optical phase-modulated signal according to a conventional technique for I-channel and Q-channel light intensity signals; and sections (c) and (d) thereof show sampling points of the received optical phase-modulated signal according to the present invention for I-channel and Q-channel light intensity signals. Section (e) of FIG. 3 shows the phase θ of a vector signal component. At each of positions where the phase θ gradually changes with time, a frequency shift occurs, and a beat is generated. The I-channel and Q-channel components are fed to the digital processing section and are combined so as to obtain a vector signal component having a phase θ. This vector signal component is converted to a digital signal, and the phase of the vector signal component is averaged over a plurality of bits so as to calculate the offset of the phase, whereby the digital signal can be demodulated.

According to the conventional technique, due to the existence of the beat component, sampling must be performed a plurality of times (4 times in the illustrated example) in each symbol period. In contrast, according to the present invention, sampling for AD conversion can be performed in synchronism with the phase-modulated signal such that the sampling is performed one time in each symbol period, and is performed in phase with the phase-modulated signal (e.g., the sampling is performed at the center of the symbol period). Thus, according to the present invention, the sampling speed can be lowered to a speed equal to that of the transmitted signal.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A coherent optical receiver comprising:
   a 90-degree optical hybrid circuit which receives an optical-coherent-modulated signal light and local oscillation light, splits the received signal light to quadrature components I and Q, and outputs the quadrature components I and Q;
   I-channel and Q-channel photo detectors which respectively receive the quadrature components I and Q output from the 90-degree optical hybrid circuit;
   a clock extraction circuit which demodulates the received signal light so as to reproduce a clock whose speed is the same as that of the demodulated signal and which is synchronized therewith;
   I-channel and Q-channel sampling circuits which sample respective signals output from the I-channel and Q-channel photo detectors, at timings determined by the reproduced clock; and
   a digital signal processing section which digitally processes the sampled signals fed from the I-channel and Q-channel sampling circuits to output a digital signal converted from the sampled signals,
   wherein a phase offset signal detected by the digital signal processing section is fed back to the clock extraction circuit so as to control the phase of the clock; and by use of filter functions realized by digital processing, the digital signal processing section compensates dispersion of light within a fiber or phase fluctuation during free-space propagation.

2. A coherent optical receiver according to claim 1, wherein the received signal light is signal light having undergone optical PSK modulation; the received signal light is input directly to a coupler as a first signal light, and the received signal light is also input to the coupler via a 1-bit delay circuit as a second signal light so as to multiply the first signal light and the second signal light together; and light produced as a result of the multiplication is detected by an optical detector so as to obtain a demodulated signal, from which the clock is reproduced.

3. A coherent optical receiver according to claim 1, wherein the received signal light is demodulated by I-channel and Q-channel multipliers which multiply the signals from the I-channel and Q-channel photo detectors by the same signals having passed through respective 1-bit delay circuits, and an adder which adds outputs of the two multipliers; and the clock is reproduced from a signal produced as a result of the demodulation of the received signal light.

4. A coherent optical receiver according to claim 1, wherein the coherent optical receiver is configured to cope with not only optical-coherent-modulated signal light, but also intensity-modulated signal light by turning the local oscillation light off.

* * * * *